Feb. 19, 1946.　　A. J. KASHUBECK ET AL　　2,395,187

DRAFT GEAR

Filed Aug. 27, 1941

INVENTORS
Archwood J. Kashubeck
Hubert L. Spence
BY John L. Eler
Albert E. Field
ATTORNEY Patented Feb. 19, 1946

2,395,187

UNITED STATES PATENT OFFICE 2,395,187

DRAFT GEAR

Archwood J. Kashubeck, Cleveland, Hubert L. Spence, East Cleveland, and John L. Eler, Cleveland, Ohio, assignors to National Malleable and Steel Castings Company, Cleveland, Ohio, a corporation of Ohio Application August 27, 1941, Serial No. 408,488

16 Claims. (Cl. 213—36)

This invention relates to cushioning mechanism for railway cars and the like and more particularly to a draft gear having a relatively high spring capacity for cushioning the lighter shocks incident to normal train operation, and a friction system that is brought into action after a predetermined amount of travel of the draft gear which absorbs the heavier blows.

It is an object of the present invention to provide a draft gear having a compact friction system comprising a pair of rockers and associated friction shoes actuated by a plunger that comes into play after a predetermined amount of travel of the device. A novel feature of the invention concerns the relation between the contacting surfaces on the plunger and shoes and the pivot points of the rockers so as to obtain a resultant force during closing of the gear in a direction that will tend to rotate the rockers in all operative positions of the friction system during closing of the draft gear.

A further object of the invention comprises novel means to maintain the friction parts tight in the housing and to take up a limited amount of wear on the friction surfaces as it occurs.

In draft gears of high spring capacity difficulty has been experienced in obtaining a uniform initial spring capacity without the necessity of expensive fitting operations. A still further object of the invention therefore resides in means for effectively controlling the initial spring capacity with the expenditure of a minimum amount of time and labor in properly fitting the parts.

Our invention also contemplates a symmetrical arrangement of the springs about the rockers so as to result in a uniform distribution of the stresses thereon and smoother operation of the friction system.

Other objects and advantages of the invention will be explained in the following description taken in conjunction with the drawings, in which.

Figure 1:
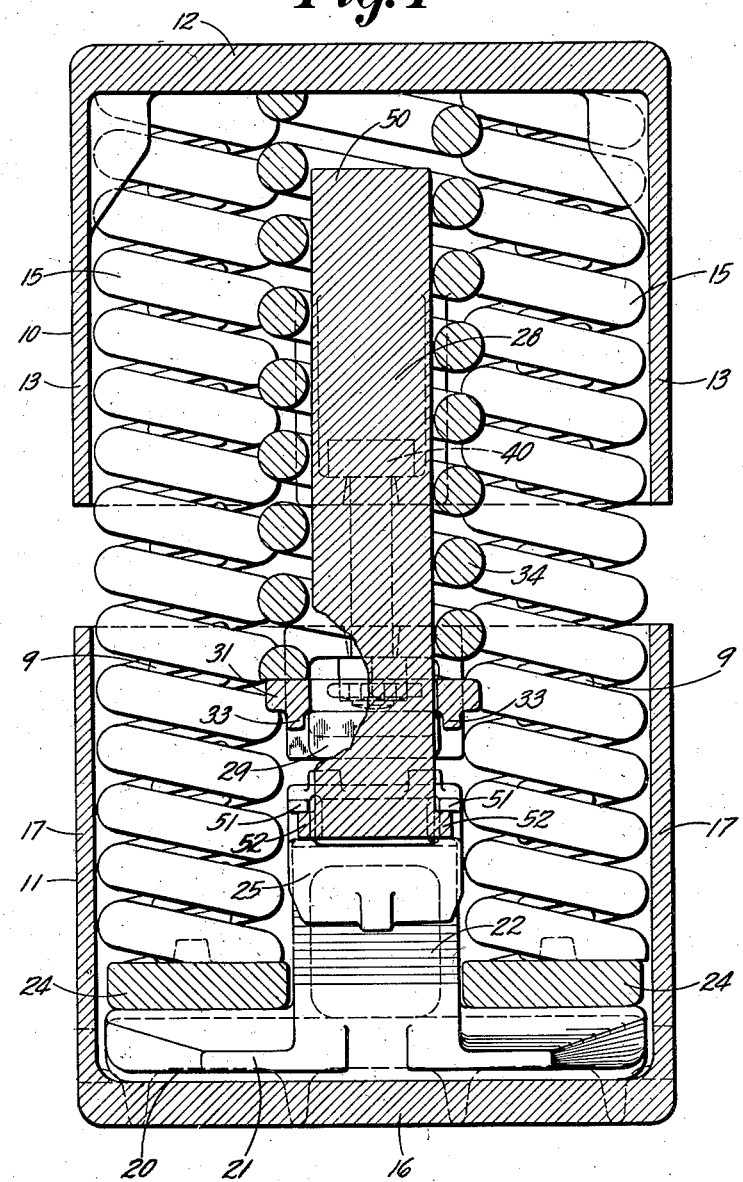
Figure 1 is a longitudinal sectional view of a draft gear embodying the invention, taken on line 1—1 of Figure 5, with part of the plunger broken away.
Figure 2:
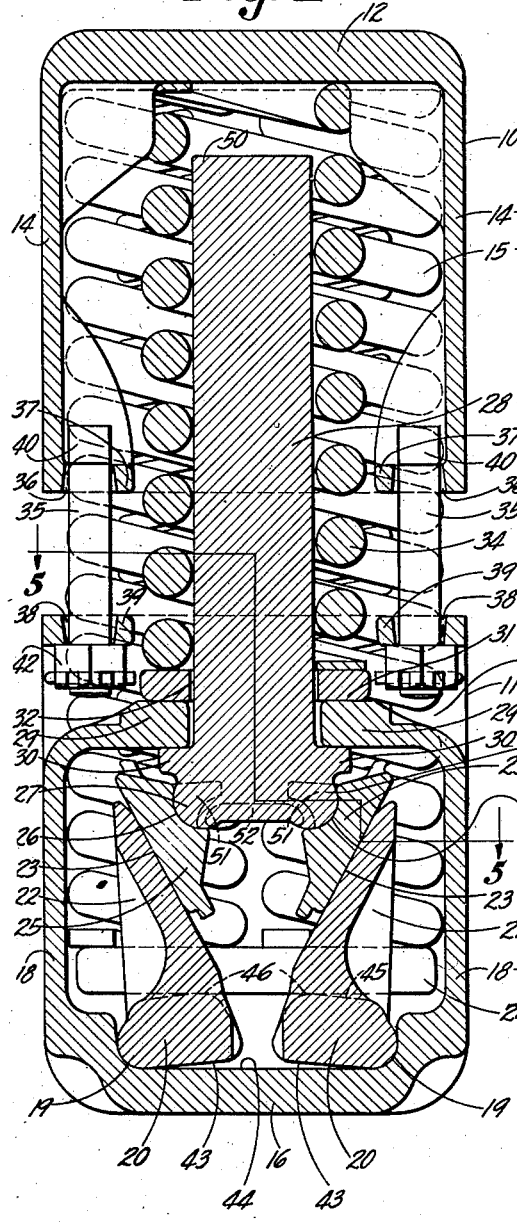
Figure 2 is a longitudinal sectional view, taken on line 2—2 of Figure 5.

Referring to the drawings, the draft gear comprises a pair of oppositely disposed hollow spring housings 10 and 11. Housing 10 is formed of end wall 12 and side walls 13, 13 and 14, 14 and encloses one end of springs 9 and 15. Housing 11 has an end wall 16 and side walls 17, 17 and 18, 18. On the inner side of end wall 16 are seats 19 for rockers 20. Each rocker comprises a transversely extending base portion 21 and a longitudinally extending arm 22 having a sloping friction surface 23. Spring seats 24 extend between the rockers on each side of arms 22 and support one end of springs 9 and 15. Engaging surfaces 23 of the rockers are friction shoes 25 each of which has a cylindrical seat 26 which receives a similarly shaped projection 27 on one end of plunger 28. The other end of plunger 28 extends into spring housing 10 and is spaced a predetermined distance from end wall 12 thereof. Projecting inwardly from side walls 18 of housing 11 are shelves 29 which overlie extensions 30 on plunger 28 and which limit outward movement of the plunger relative to the housing.

Resting on the opposite side of shelves 29 from extensions 30 is a spring supporting member 31 having an opening 32 therein for passage of plunger 28. Downwardly extending flanges 33 on member 31 on either side of shelves 29 serve to position the member transversely of the housing. Extending between member 31 and wall 12 of housing 10 is a spring 34 adapted to normally force housings 10 and 11 apart. Retaining bolts 35 extend through openings 36 in flanges 37 of housing 10 and through openings 38 of flanges 39 of housing 11 to hold the parts in assembled relation. Bolts 35 have T-shaped heads 40 which are prevented from turning by contact with adjacent walls 14 of housing 10. Openings 41 are provided in walls 18 of housing 11 to receive nuts 42.

It will be observed that when the parts are in assembled relation, rockers 20 are tipped slightly so that surface 43 on the bottom of each rocker slopes inwardly away from inner surface 44 of wall 16 of housing 11. Also, upper surface 45 of each rocker engages spring seats 24 along a line 46 which is spaced laterally of seat 19 on the housing. Springs 9 and 15 therefore rotate the rockers inwardly toward the shoes forcing the latter upwardly until stopped by contact of extensions 30 with the underside of shelves 29. The aforesaid clearance between the bottoms of the rockers and wall 16 also enables a limited amount of wear to take place on the friction surfaces and still maintain extensions 30 in contact with shelves 29. Thus the friction parts are normally held tight in the case.

Figure 3:
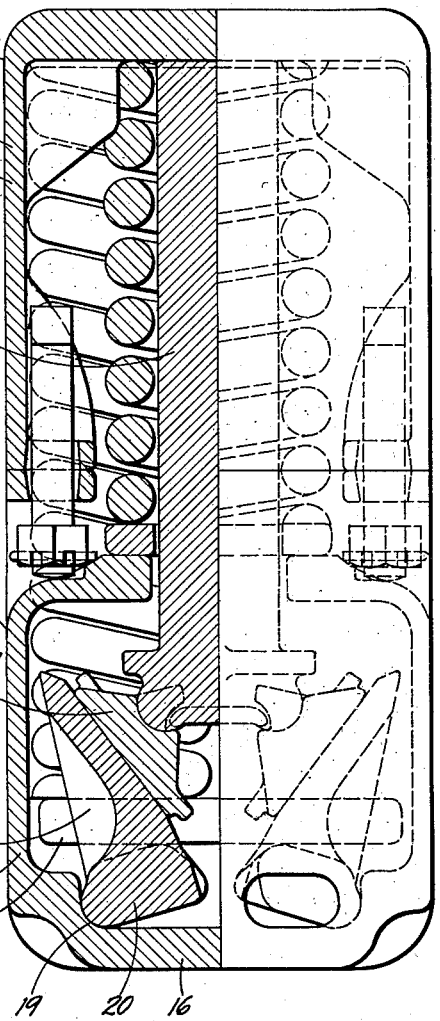
Figure 3 is a view similar to Figure 2, showing the draft gear fully compressed.
Figure 4:
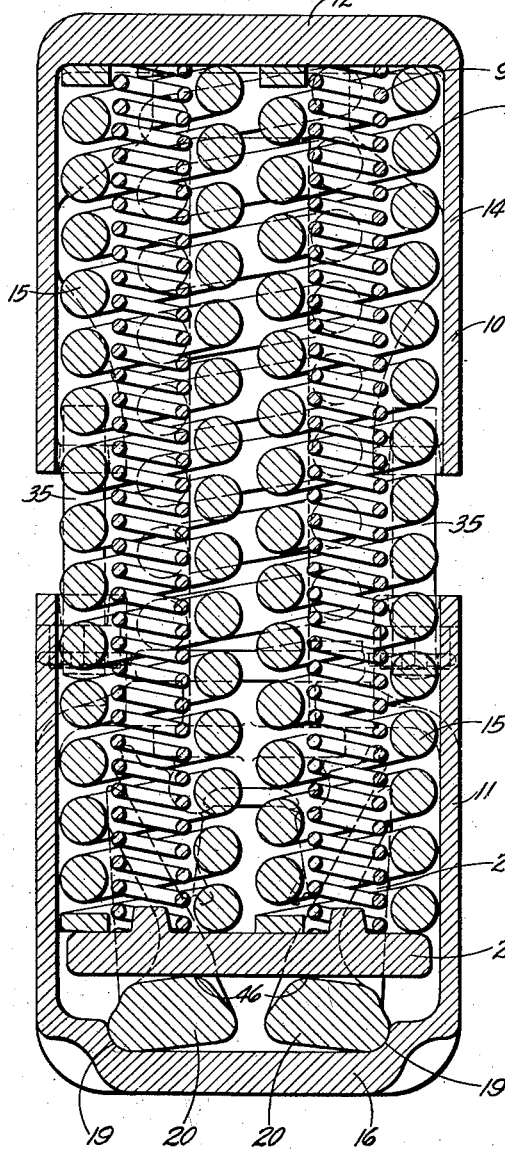
Figure 4 is a longitudinal sectional view, taken on line 4—4 of Figure 5.
Figure 5:
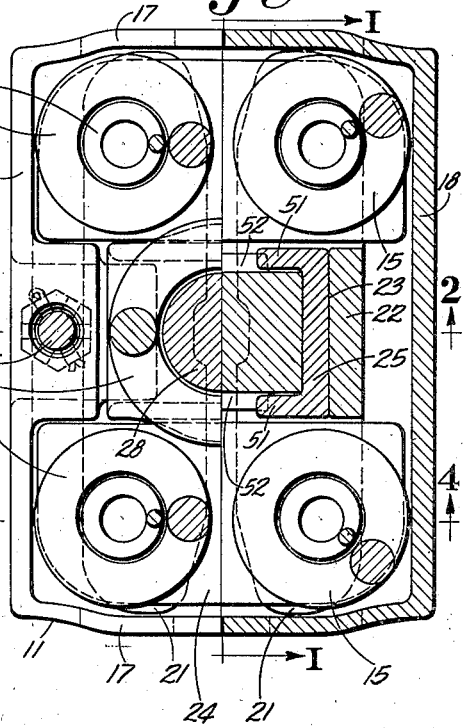
Figure 5 is a transverse sectional view, taken on line 5—5 of Figure 2.

Springs 9, 15 and 34 resist relative movement of housings 10 and 11 towards each other, and after a predetermined amount of movement end wall 12 of housing 10 contacts the adjacent end 50 of plunger 28. Further movement of housings 10 and 11 towards each other moves plunger 28 and shoes 25 downwardly relative to housing 11 and causes the shoes to slide along surfaces 23 of rockers 20. The wedging action of shoes 25 as they move downwardly rotates rockers 20 on seats 19 and spring seats 24 are forced, by the rockers, away from wall 16 against the resistance of springs 9 and 15 (see Figure 3).

That part of the closing force which actuates the friction system is divided between shoes 25 and their associated rockers. In order to obtain the desired amount of travel of the friction parts the rockers must be rotated outwardly by the shoes and plunger an amount sufficient to permit the plunger to move the required distance longitudinally of housing 11. If the resultant of the forces acting on each of the rockers passes through or inside of the center of curvature of its seat 19, there will be no force tending to rotate the rockers, hence no movement of the friction parts. We have found that by placing the centers of curvatures of projections 27 a substantial distance on either side of the center line of the draft gear the forces exerted on the rockers through the shoes are in directions such that the resultants thereof pass outside the center of curvature of seats 19 and the rockers are rotated throughout the closing movement of the draft gear. In the embodiment shown in the drawings the centers of curvature of projections 27 are about halfway between the center line of the draft gear and the centers of curvature of seats 19.

In order to limit downward movement of shoes 25 relative to plunger 28 and to prevent seat 26 of each shoe from being disengaged from its associated projection 27, each shoe is formed with projections 51 which overlie lugs 52 on the sides of plunger 28. Engagement of projections 51 with lugs 52 will limit further movement of the shoes downwardly relative to the plunger. These lugs and projections are spaced apart sufficiently to permit the required amount of angling between the shoes and plunger as they move downwardly during compression of the draft gear.

It will be observed that springs 9 and 15 are placed in the corners of the rectangular housings 10, 11 and that spring seats 24 extend between the base portions 21 of the rockers on each side of longitudinally extending arms 22. The pressure of the springs is thus applied equally on each side of the rockers. Also, with the above arrangement of corner springs and with spring 34 taking up a substantial part of the space between the corner springs, the available space for the spring resistance is effectively used, thus resulting in a cushioning mechanism having a high spring capacity.

It has been found that for draft gears to be used in passenger train service and the like that a high ultimate spring capacity is very desirable. However, it is also well recognized that for smooth passenger train operation the initial capacity of the draft gear should be in the neighborhood of 3,000 pounds. Since high capacity springs must be used to obtain the high ultimate capacity required of the springs, within the space and travel limitations, a variation of as little as $\frac{1}{16}''$ in length of such a spring may result in a variation of several thousands of pounds in initial capacity. Therefore, to obtain the above figure for initial capacity it has been necessary in previous constructions, to spend considerable time in individually fitting and adjusting the parts of the draft gear so that the initial capacity would be within the desired range. These fitting operations consisted mainly in grinding or machining the ends of the springs or the spring housings where the springs were too long, or by using shims in cases where the springs were too short. The present invention contemplates a novel arrangement of springs to reduce to a minimum the time and expense involved in these fitting operations.

Figure 6:
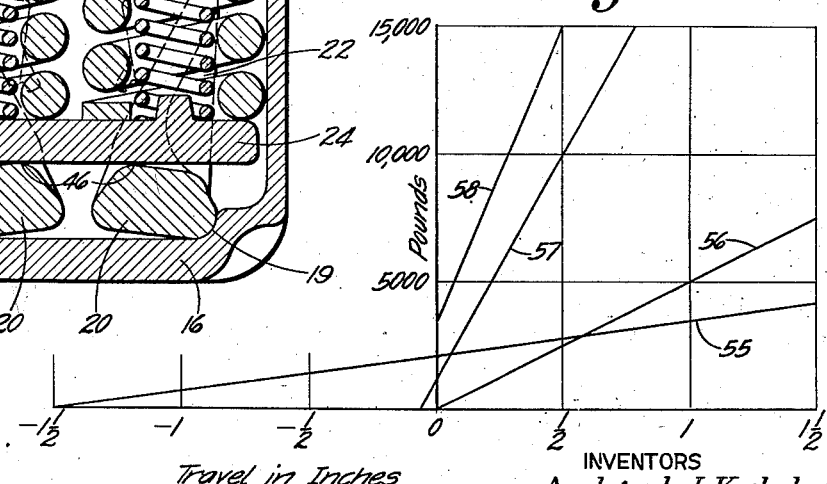
Figure 6 is a graph showing the load-travel characteristics of the springs.

It will be observed that in addition to the high capacity springs 15 and 34, we use a plurality of low capacity springs 9 which fit inside of springs 15. Figure 6 shows the load-travel characteristics of springs 9, 15 and 34 for a part of the travel of the draft gear so as to illustrate the effect of springs 9 on the initial capacity of the device. On this graph line 55 represents the load-travel characteristic of springs 9, line 56 that of spring 34, line 57 that of springs 15, and line 58 the total of all of the springs. The zero point on the graph, so far as travel in inches is concerned, is the required standard assembled height of the draft gear, and the lines and figures to the left of the zero point show the amounts of initial compression of the various springs. The novel feature in this arrangement is in the use of spring means having a low ratio of load to compression or travel which make up a substantial part of the initial capacity of the device. In this connection it will be noted that springs 9 are under an initial compression of one and one-half inches and that the load on them at the zero point is about 2,000 pounds. Springs 15 (line 57 on the graph) are under a slight amount of initial compression so as to maintain a constant pressure on the rockers when the gear is assembled and to compensate for wear on the parts of the friction system. Spring 34 (line 56) is under no initial compression. It will thus be seen that the load on springs 9 constitutes about two-thirds of the initial capacity of the draft gear and that changes in the free height of these springs within normal manufacturing tolerances, will have practically no effect on the total spring capacity at the zero point. Springs 15, on the other hand, which provide only about one-third of the inital capacity, can vary, within normal manufacturing tolerances, and still result in an initial capacity for the device within the desired range. In other words, the springs with the relatively high ratio of load to compression are used to obtain the desired high ultimate capacity and are under little or not initial compression and the springs with a relatively low ratio of load to compression are under a considerable amount of initial compression so as to provide a major part of the initial capacity of the device.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What we claim is:

1. In a shock absorbing mechanism, a pair of spring housings, resilient means between said housings normally holding them apart, a pair of rockable friction members in one of said housings having portions in engagement with said resilient means and having sloping friction surfaces, friction shoes engaging said surfaces, and a shoe actuating member adapted to be moved by one of said housings relative to the other, said shoes being operatively connected to said last named member for rotation about spaced points and being adapted to be moved with said actuating member to rock said friction members against the resistance of said resilient means.

2. In a shock absorbing mechanism, a pair of spring housings, rockable friction members in one of said housings, said last named housing having inwardly projecting flanges overlying said friction members, spring means between said flanges and the other of said housings forcing said housings apart, friction shoes engaging said friction members, a plunger between said shoes and said flanges, and spring means between said friction members and one of said housings adapted to rock said friction members inwardly of said mechanism to force said plunger into engagement with said flanges.

3. In a shock absorbing mechanism a pair of housings, pivotally mounted friction members in one of said housings each having a sloping friction surface, a friction shoe engaging each of said sloping surfaces, shoe actuating means engaging said shoes and pivoted with respect thereto about spaced points of curvature, said shoe actuating means extending from said shoes into the other of said housings and adapted to be engaged thereby during relative movement of said housings towards each other to force said shoes against said friction members, and spring means extending from said friction members to said other housing to resist relative movement of said housings towards each other.

4. In a shock absorbing mechanism a housing, friction members pivotally mounted in said housing, a plunger having an end extending into said housing, said plunger having spaced cylindrical surfaces, friction shoes engaging said friction members and said surfaces, a second housing movable relative to said first named housing receiving the other end of said plunger, and spring means between said friction members and said second housing for resisting relative movement of said housings towards each other, said second housing being adapted to move said plunger and shoes relative to said friction members to pivot the latter against the resistance of said spring means.

5. In a shock absorbing mechanism a pair of relatively movable members, a plurality of rocker means in one of said members, each of said rocker means having a longitudinally extending friction arm formed with a sloping friction surface and a base portion extending laterally of said mechanism on each side of said arm, spring means operatively engaging said rockers and the other of said members, friction shoes engaging said friction surfaces, and shoe actuating means movable by one of said members adapted to move said shoes and rotate said rocker means against the resistance of said spring means.

6. In a shock absorbing mechanism a pair of relatively movable members, rocker means in one of said members adapted to pivot with respect thereto, each of said rocker means having a longitudinally extending arm with an angularly arranged friction surface thereon and having a lateral extension on each side of said arm, a friction shoe engaging each of said arms adapted to rotate said rocker means upon movement of said shoe in one direction relative to said member, shoe actuating means adapted to move said shoes in said one direction upon relative movement of said members towards each other, and spring means between said rocker means and one of said members adapted to resist rotation of said rocker means.

7. In a cushioning mechanism a pair of relatively movable members, a pair of rockers in one of said members, each rocker comprising a friction arm, having an angularly arranged friction surface, and a lateral extension from each side of said arm, a pair of spring seat members each resting on an extension of each rocker, spring means on said seat members extending towards the other of said members adapted to rotate said arms inwardly of the mechanism, friction shoes engaging the friction surfaces on said arms, and means engageable with said shoes for moving the latter to rotate said rockers outwardly of said mechanism upon relative movement of said members towards each other.

8. In a railway draft mechanism a pair of relatively movable follower members, soft acting spring means of low capacity in said members, having a relatively low ratio of load to compression, other relatively stiff acting spring means of high capacity having a relatively high ratio of load to compression acting in parallel with said first mentioned spring means, stop means limiting relative movement of said followers away from each other, said mechanism having an initial compression of predetermined value, a substantial amount of said initial compression being provided by the initial compression of said soft acting spring means of low capacity so as to minimize the effect of variations in the initial compression of said stiff acting spring means of high capacity, said stiff acting spring means of high capacity providing substantially the entire spring resistance of said mechanism when compressed to its maximum extent.

9. In a railway draft mechanism comprising a friction system and a spring system, said spring system providing the sole initial resistance offered by said mechanism and said friction system being adapted to be brought into action after a predetermined amount of movement of said spring system, and means controlling the initial resistance of said spring system comprising a plurality of spring means certain of which have a low ratio of load to compression relative to others of said spring means, said spring means having said low ratio of load to compression comprising the major portion of said initial resistance of said mechanism.

10. In a cushioning mechanism, a housing having a pair of rockers pivotally mounted in one end thereof, each of said rockers having a base portion engaging said housing and a centrally positioned longitudinally extending arm, each of said arms being formed with a sloping friction surface, spring means in said housing operatively engaging the base portions of said rockers on each side of said arms adapted to rotate said rockers inwardly of said mechanism, and friction shoes engaging the friction surfaces of said arms adapted to move longitudinally of said housing to rotate said rockers outwardly of said mechanism against the resistance of said spring means.

11. In a cushioning mechanism, a housing having an end wall, rocker means having base portions pivotally mounted on said end wall and having centrally positioned longitudinally extending arms, spring means engaging said base portions at points spaced laterally from the pivotal axis of said base portions adapted to rotate said rocker means inwardly of said mechanism, friction shoes engaging said arms each shoe having a curved seat thereon, and shoe actuating means having cylindrical surfaces formed about spaced centers of curvature engaging the seats on said shoes, said shoe actuating means being adapted to move said shoes on said arms and rotate said rockers against the resistance of said spring means.

12. In a cushioning mechanism, a housing having an end wall with spaced curved seats, rockers each having a base portion pivotally engaging one of said seats and a centrally positioned arm extending from said base portion and formed with sloping friction surfaces, friction shoes engaging said surfaces, shoe actuating means adapted to move said shoes toward said end wall, stop means limiting movement of said shoe actuating means away from said end wall, and spring means engaging said base portions at points spaced inwardly of said seats adapted to rotate said rockers and move said shoe actuating means into engagement with said stop means.

13. In a cushioning mechanism, a housing having an end wall with spaced curved seats, rockers each having a base portion pivotally engaging one of said seats and a centrally positioned arm extending from said base portion and formed with sloping friction surfaces, friction shoes engaging said surfaces, shoe actuating means adapted to move said shoes toward said end wall, stop means limiting movement of said shoe actuating means away from said end wall, and spring means engaging said base portions at points spaced inwardly of said seats adapted to rotate said rockers and move said shoe actuating means into engagement with said stop means, said base portions each having a surface sloping from one of said seats away from said end wall, when said parts are in normal position, so as to allow said rockers to rotate inwardly of said mechanism to compensate for wear on the parts.

14. In a cushioning mechanism, a rectangular housing having an end wall, a pair of curved seats on said end wall, a pair of rockers pivotally engaging said seats, each rocker comprising a base portion having a seat engaging surface and a centrally positioned arm extending away from said end wall, a member on each side of said arms extending between said base portions and engaging the latter laterally inwardly of said seats, a spring in each corner of said housing engaging one of said members, said springs being adapted to rotate said rockers inwardly of said housing, friction shoes engaging said arms, shoe actuating means for moving said shoes toward said end wall to rotate said rockers against the resistance of said spring means, and stop means limiting movement of said shoe actuating means away from said end wall.

15. In a cushioning mechanism, a rectangular housing having an end wall, a pair of curved seats on said end wall, a pair of rockers pivotally engaging said seats, each rocker comprising a base portion having a seat engaging surface and a centrally positioned arm extending away from said end wall, a member on each side of said arms extending between said base portions and engaging the latter laterally inwardly of said seats, a spring in each corner of said housing engaging one of said members, said springs being adapted to rotate said rockers inwardly of said housing, friction shoes engaging said arms, shoe actuating means for moving said shoes toward said end wall to rotate said rockers against the resistance of said spring means, and stop means limiting movement of said shoe actuating means away from said end wall, each of said base portions of said rockers having a surface sloping from one of said seats away from said end wall when said shoe actuating means is in engagement with said stop means to allow said rockers to rotate inwardly of said housing to compensate for wear of the parts.

16. In a cushioning mechanism, a housing, rockers pivotally mounted in said housing, said rockers having sloping friction surfaces, spring means engaging said rockers adapted to rotate the latter inwardly of said housing, friction shoes engaging said friction surfaces adapted to move longitudinally of said housing to rotate said rockers outwardly with respect to said housing, shoe actuating means for moving said shoes longitudinally of said housing, and engageable means on said shoe actuating means and shoes for limiting movement of the latter away from said shoe actuating means.

ARCHWOOD J. KASHUBECK.
HUBERT L. SPENCE.
JOHN L. ELER.